US006227970B1

(12) United States Patent
Shimizu et al.

(10) Patent No.: US 6,227,970 B1
(45) Date of Patent: May 8, 2001

(54) SLOT MACHINE

(75) Inventors: Toshiaki Shimizu, Artarmon (AU); Eiji Aida, Yokohama (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 09/109,357

(22) Filed: Jul. 2, 1998

(30) Foreign Application Priority Data

Aug. 8, 1997 (JP) ................................................ 09-215092

(51) Int. Cl.[7] .............................. A63F 13/00; A63F 9/24; G06F 17/00; G06F 19/00

(52) U.S. Cl. ................................ 463/20; 463/16; 463/17; 463/18; 463/21; 463/25; 463/29; 463/30; 273/138.1; 273/139; 273/148 R; 273/149 R

(58) Field of Search ................................ 463/20, 31, 25, 463/29, 30, 36, 16–19, 21; 273/138.1, 138.2, 139, 143 R, 138 A, 85 CP, 85 G, 148 R, 149 R; 194/350

(56) References Cited

U.S. PATENT DOCUMENTS 4,572,509 * 2/1986 Sitrick ................................ 273/85 G
5,033,744 * 7/1991 Bridgeman et al. ............. 273/85 CP
5,127,651 * 7/1992 Okada .............................. 273/143 R
5,342,047 * 8/1994 Heidel et al. .................... 273/85 CP
5,553,864 * 9/1996 Sitrick .................................... 463/31
5,984,780 * 11/1999 Takemoto et al. ..................... 463/20

FOREIGN PATENT DOCUMENTS 640198 8/1991 (AU) .
0253584 1/1988 (EP) .
0769769 4/1997 (EP) .
0789338 8/1997 (EP) .
63-172366 7/1988 (JP) .
6-285257 10/1994 (JP) .
7-39618 2/1995 (JP) .
8-80364 3/1996 (JP) .
8-131610 5/1996 (JP) .
WO 97/27921 8/1997 (WO) .

* cited by examiner

*Primary Examiner*—Jessica J. Harrison
*Assistant Examiner*—Binh-An D. Nguyen
(74) *Attorney, Agent, or Firm*—Jordan and Hamburg LLP

(57) ABSTRACT

A slot machine includes a housing having a front side with an operation panel disposed thereon, a main display device having a screen disposed on the front side of the housing above the operation panel, and a sub-display device disposed on the operation panel. A main input device accepts manual operation of a player and issues information corresponding to the manual operation of the player. The main input device includes a first input device provided on the operation panel and a second input device provided on the screen of the main display device. A game controller controls a process of a game performed on a screen of the main display device based on the information issued from the main input device.

15 Claims, 10 Drawing Sheets

SLOT MACHINE

BACKGROUND OF THE INVENTION

1. Field of the Invention

The present invention relates to a slot machine comprising a sub-display device provided apart from a main display device for displaying game images.

2. Description of the Related Art

As one type of slot machines, there is known a slot machine in which a sub-display device for displaying information, such as histories of past games, is provided above a main display device for displaying game images (for example, refer to Australian Patent No. 640198).

In the typical slot machine, an operation panel is provided below the main display device, that is, at a position near the hands of a player facing the game image on a screen of the main display device. The player inserts coins, tokens, or slips into a slot provided on the operation panel, and then operates buttons provided on the operation panel while paying attention to the game image to thereby enjoy the play of the game. Accordingly, if the sub-display device is disposed above the main display device, the sub-display device is out of the range in which the viewpoint of the player moves during the game, thereby causing difficulty watching the sub-display device.

Also, the screen of the sub-display device disposed above the main display device is far away from the player. Thus, it is difficult to read the details of the information displayed on the screen thereof. In order to solve this problem, it is necessary to restrict the volume of the information displayed in the sub-display device, or to enlarge the screen of the sub-display device. However, the upper portion of a front side of the slot machine is usually provided with a title panel for decoration or the like. Therefore, if the screen of the sub-display device is enlarged, the area of the title panel is reduced and the decoration effect thereof is spoiled.

SUMMARY OF THE INVENTION

It is an object of the present invention to provide a slot machine improved in an arrangement of a sub-display device to facilitate observation thereof.

According to the present invention, there is provided a slot machine comprising a housing provided with an operation panel on a front side thereof; a main display device disposed above the operation panel; a sub-display device disposed on the operation panel; a main input device capable of issuing information corresponding to an operation of a player; and a game controller for controlling a process of a game performed on a screen of the main display device with based on the information issued from the main input device; wherein the main input device comprises a first input device provided on the operation panel and a second input device provided on the screen of the main display device or a periphery thereof.

In the above slot machine, the player plays the game by operating both of the first input device and the second input device and the viewpoint of the player moves between the main display device and the operation panel. Therefore, the sub-display device disposed on the operation panel is included within the view range of the player during the game. Accordingly, the player can confirm contents displayed in the sub-display device easily. Also, since the second input device is provided on the screen of the main display device or a periphery thereof, it is possible to distribute a part of input members which cannot be arranged on the operation panel due to lack of space for the input members caused by the arrangement of the sub-display device. Therefore, the player can play the game without feeling inconvenience caused by a shortage of input members. Further, it is not necessary to provide a sub-display device above the main display device. Therefore, it can be possible to enlarge the area of the title panel disposed above the main display device to thereby enhance the decorative effect thereof.

In the above slot machine, the second input device may be put on the screen of the main display device and may comprise a coordinate readout device formed as a transparent panel and capable of issuing signals for specifying coordinates of a position touched by the player. In this case, it is not necessary to reduce the area of the screen of the main display device due to the arrangement of the second input device.

The game controller may be capable of displaying an image representing an operation button to which a predetermined function is assigned in a predetermined area on the screen of the main display device, and of distinguishing operation of the player on the basis of the signals issued from the coordinate readout device in association with contents displayed in the predetermined area on the screen of the main display device.

The game controller can change the contents displayed in the predetermined area on the screen of the main display device. Also, the game controller can change images to be displayed in at least a part of the predetermined area between the image of the operation button and an image representing a message to the player. In these cases, it is possible to use efficiently the limited area of the screen of the main display device to provide various input means thereon.

The first input device may comprise a push button switch.

The slot machine can further comprise a sub-input device provided on a screen of the sub-display device or a periphery thereof and capable of issuing information corresponding to an operation of the player thereto. In this case, it is possible to constitute input means for inputting information, instruction or request, regarding the process of the game or an purpose unrelated thereto by associating the contents displayed on the screen of the sub-display device and the operation of the sub-input device.

The slot machine may comprise a sub-image display control device for controlling contents displayed on the screen of the sub-display device based on the information issued from the sub-input device. In this case, it is possible to constitute an input system apart from the input system constituted by the main display device and the main input device.

A push button switch capable of being depressed by the player may be provided on an outside of the screen of the sub-display device as the sub-input device, and the sub-image display control device can display an image for representing a function assigned to the push button switch on the screen of the sub-display device in such a manner that a relationship between the push button switch and the image for representing the function is visually expressed. In this case, the player can easily grasp the function assigned to the sub-input device.

The operation panel may be provided, at one end thereof, with an insertion portion for receiving a medal and/or a slip to be bet on the game, the screen of the sub-display device may be disposed at another end of the operation panel and the first input device may be disposed between the insertion portion and the screen of the sub-display device.

An operation of relatively high frequency among a plurality of operations necessary for the game may be assigned to the first input device, and another operation of relatively low frequency among the plurality of operations may be assigned to the second input device.

The slot machine can further comprise a sub-input device provided on a screen of the sub-display device or a periphery thereof and capable of issuing information corresponding to an operation of the player; a set-up device for setting up stop condition for limiting continuation of the game to a predetermined degree in accordance with an instruction inputted by the player through the sub-input device; a memory device which stores data of the stop condition set up by the set-up device; a detection device for detecting an actual degree of the continuation of the game; a judging device for judging whether or not the game is continued until the stop condition is satisfied on the basis of the data of the stop condition stored in the memory device and the actual degree detected by the detection device; and an alarm device issuing a predetermined alarm when it is judged that the stop condition is satisfied.

In this case, since the alarm is issued when the game is continued until the stop condition is satisfied, it is possible to prevent the player from continuing the game beyond the limit set up by himself or herself. Also, the sub-display device and the sub-input device can be utilized to set up the limitation of the play.

The detection device may detect the actual degree of the continuation from a reference time at which the stop condition is set up by the set-up device.

The game controller may pay out a prize to the player in accordance with play value bet on the game by the player and the result of the game, the set-up device may be fitted to set up a limitation of a total amount of the play value as the stop condition, the detection device may detect an actual total amount of the play value consumed by the player, and the judging device may judge that the game is continued to satisfy the stop condition when the actual total amount of the play value detected by the detection device reaches to the limitation of the total amount.

In this case, it is possible to prevent the player from continuing the game beyond the economical limit.

The set-up device may be fitted to set up limitation of play time as the stop condition, the detection device may detect actual play time, and the judging device may judge that the game is continued to satisfy the stop condition when the actual play time detected by the detection device reaches to the limitation of the play time.

In this case, it is possible to prevent the player from continuing the game beyond the time limit.

BREIF DESCRIPTION OF THE DRAWINGS

DETAILED DESCRIPTION OF THE PREFERRED EMBODIMENTS

The preferred embodiment of the present invention will now be explained below with reference to the attached drawings.

Figure 1:
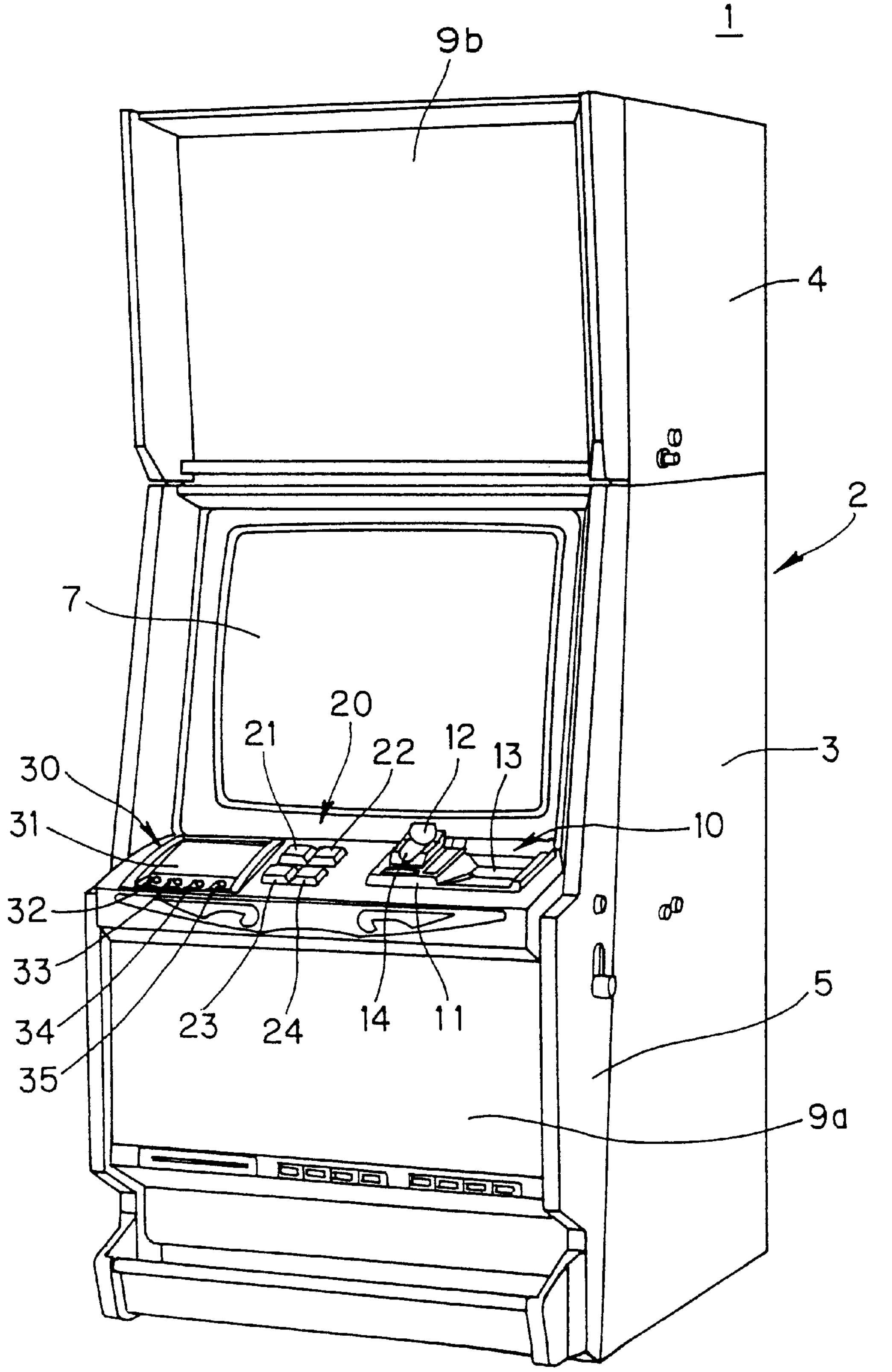
FIG. 1 is a perspective view showing an embodiment of a slot machine to which the present invention is applied.

FIG. 1 shows a general appearance of a slot machine to which the present invention is applied. As shown in the FIG. 1, the slot machine 1 comprises a housing 2 standing upright. The housing 2 comprises a main body 3, a top box 4 mounted on a top portion of the main body 3 and a door 5 attached to a front side of the main body 3 so as to be swingable between an open position and a close position. At a center portion of the front side of the main body 3, there is mounted a main display device 7 comprising a CRT, and below the main display device 7 is provided an operation panel 8. The operation panel 8 is attached to the door 5 so as to slope down in a forward direction of the slot machine 1. Below the operation panel 8 and on a front side of the top box 4, there are provided decoration panels 9*a* and 9*b* on which pictures, letters and the like representing a title of the slot machine 1 or the like are illustrated.

Figure 2:
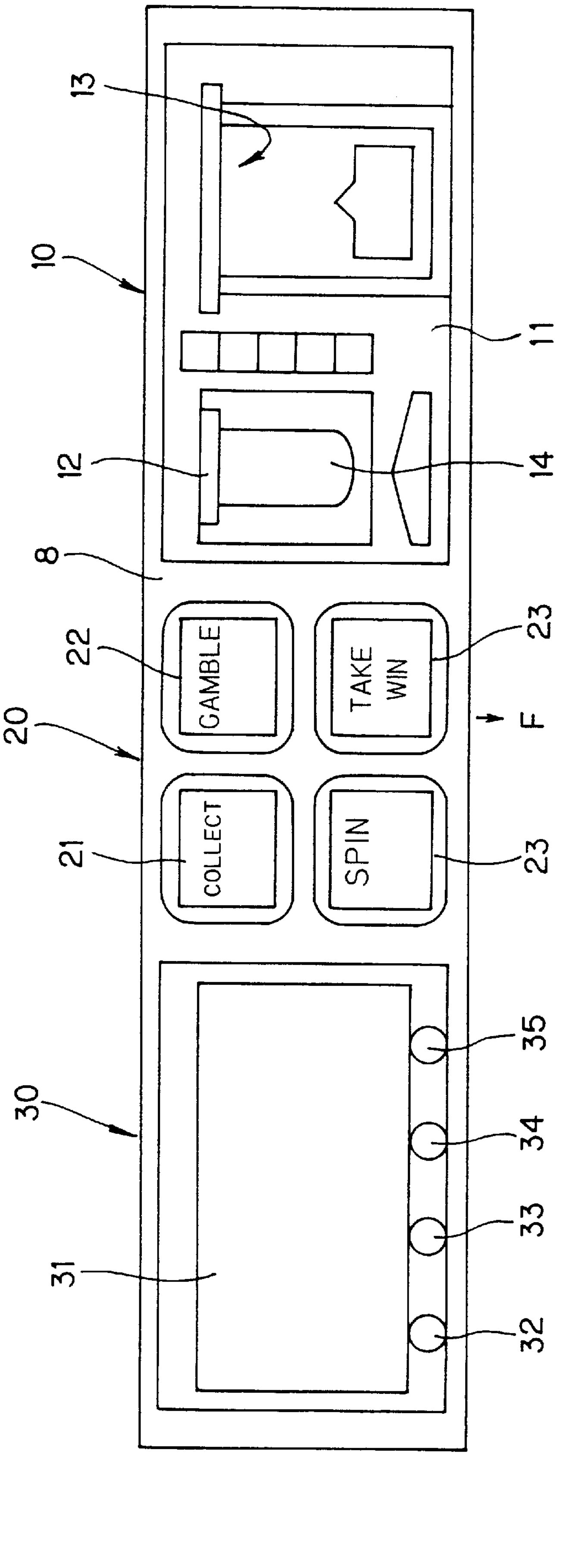
FIG. 2 is a plan view of an operation panel provided in the slot machine of FIG. 1.

As shown in FIG. 2, the operation panel 8 is provided, from a right end toward a left end thereof, with an insertion portion 10, an operation portion 20 and a sub-display portion 30. The insertion portion 10 is provided with a slot base 11 integrally formed with a medal insertion portion 12 and a slip insertion portion 13. The slot base 11 is also provided with a medal holder 14 adjoining the medal insertion portion 12. The medal holder 14 slopes down toward the front end (lower end in FIG. 2) thereof. The player can put medals on the medal holder 14, and can play the game while supporting these medals by the thumb of his or her right hand at the front side of the medal holder 14. Note that the word "medal" includes coins or tokens, and the word "slip" includes bills.

The operation portion 20 is provided with four push button switches 21, 22, 23 and 24 as first input devices, each of which is capable of being depressed. These push button switches 21–24 are selected as switches to be operated with particular high frequency during the game, so that theses switches are provided on the operation panel 8. For example, the push button switch 23 at a lower left position of the four switches is operated for starting the game. The number of the push buttons provided at the operation portion 20 and functions assigned to the push buttons can be properly changed.

The sub-display portion 30 is provided with a sub-display device 31 comprising a liquid crystal panel, and four push button switches 32, 33, 34 and 35 arranged along a lower side of a screen of the sub-display device 31. Each of the push button switches 32, 33, 34 and 35 is capable of being depressed and works as a sub-input device.

Figure 3:
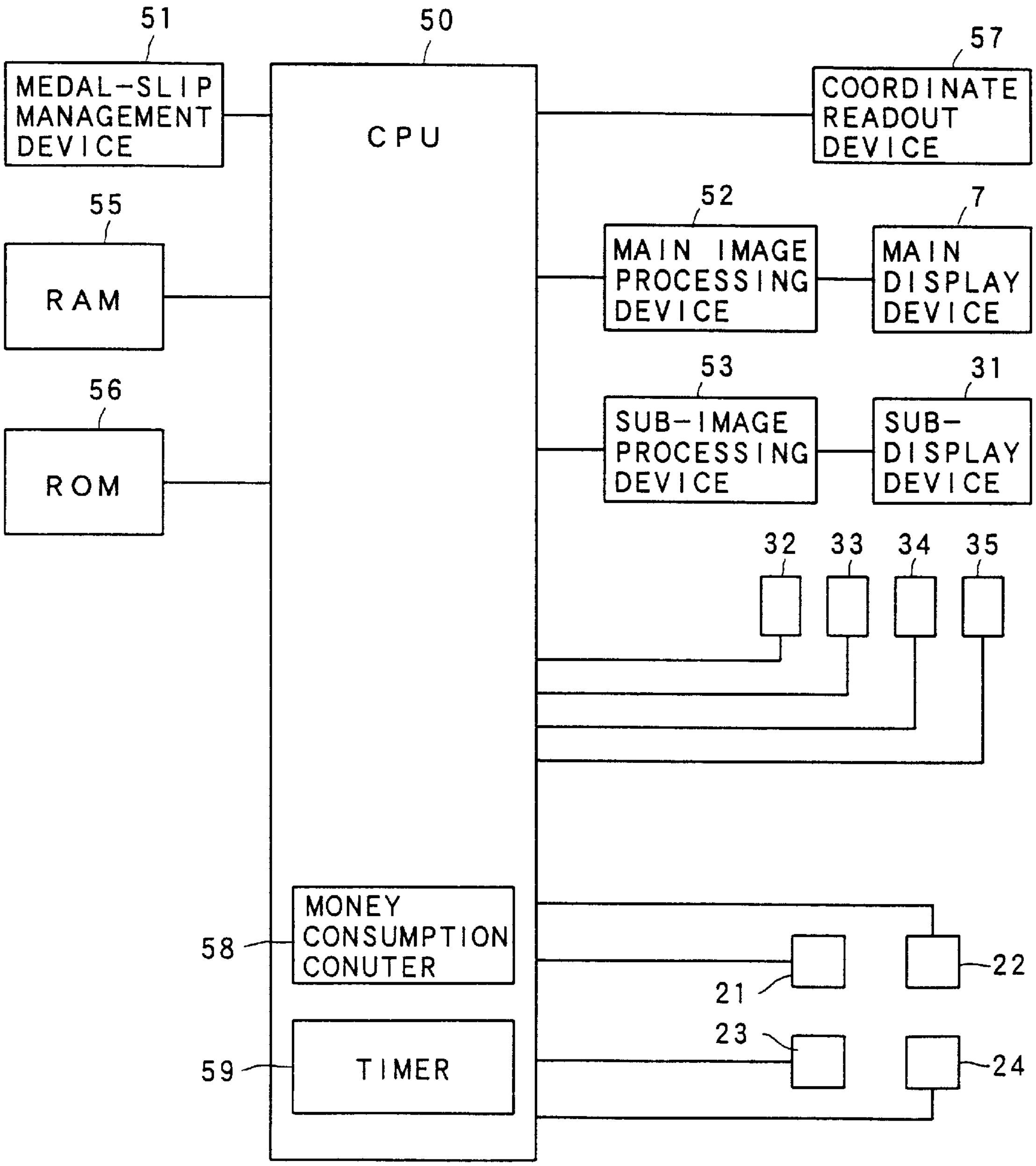
FIG. 3 is a block diagram illustrating a schematic configuration of a control system of the slot machine illustrated in FIG. 1.

FIG. 3 is a block diagram illustrating a schematic configuration of a control system provided in the slot machine 1. The slot machine 1 comprises a CPU 50 as a game controller, a medal-slip management device 51, a main image processing device 52, a sub-image processing device 53, a RAM 55 as a memory device and a ROM 55. The CPU 50 is mainly composed of a microprocessor unit and performs various calculations and motion control necessary for the progress of the game. The medal-slip management device 51 detects the insertion of a medal and a slip from the medal insertion portion 12 and the slip insertion portion 13, and performs a necessary process for managing the medal and the slip. For example, the device 51 judges whether the medal and the slip are real or counterfeit, and keeps the medal and the slip judged as real while rejecting the medal and the slip judged as counterfeit. The main image processing device 52 and the sub-image processing device 53 interpret commands issued from the CPU 50 and displays desirable images on the main display device 7 and the sub-display device 31, respectively. The RAM 55 temporary stores programs and data necessary for the progress of the game, and the ROM stores, in advance, programs and data for controlling basic operation of the slot machine 1, such as the booting operation thereof.

The CPU 50 is electrically connected with a coordinate readout device 57 as well as the above mentioned push button switches 21–24 and 32–35. The coordinate readout device 57 works as a second input device and comprises, for example, a so-called touch panel formed as a transparent panel and capable of issuing signals corresponding to the coordinates of a position touched by the player. The coordinate readout device 57 is closely put on the surface of the main display device 7. In the CPU 50, there are provided a money consumption counter 58 for counting value of money consumed in each game and a timer 59. The functions of these will be explained later.

Figure 4:
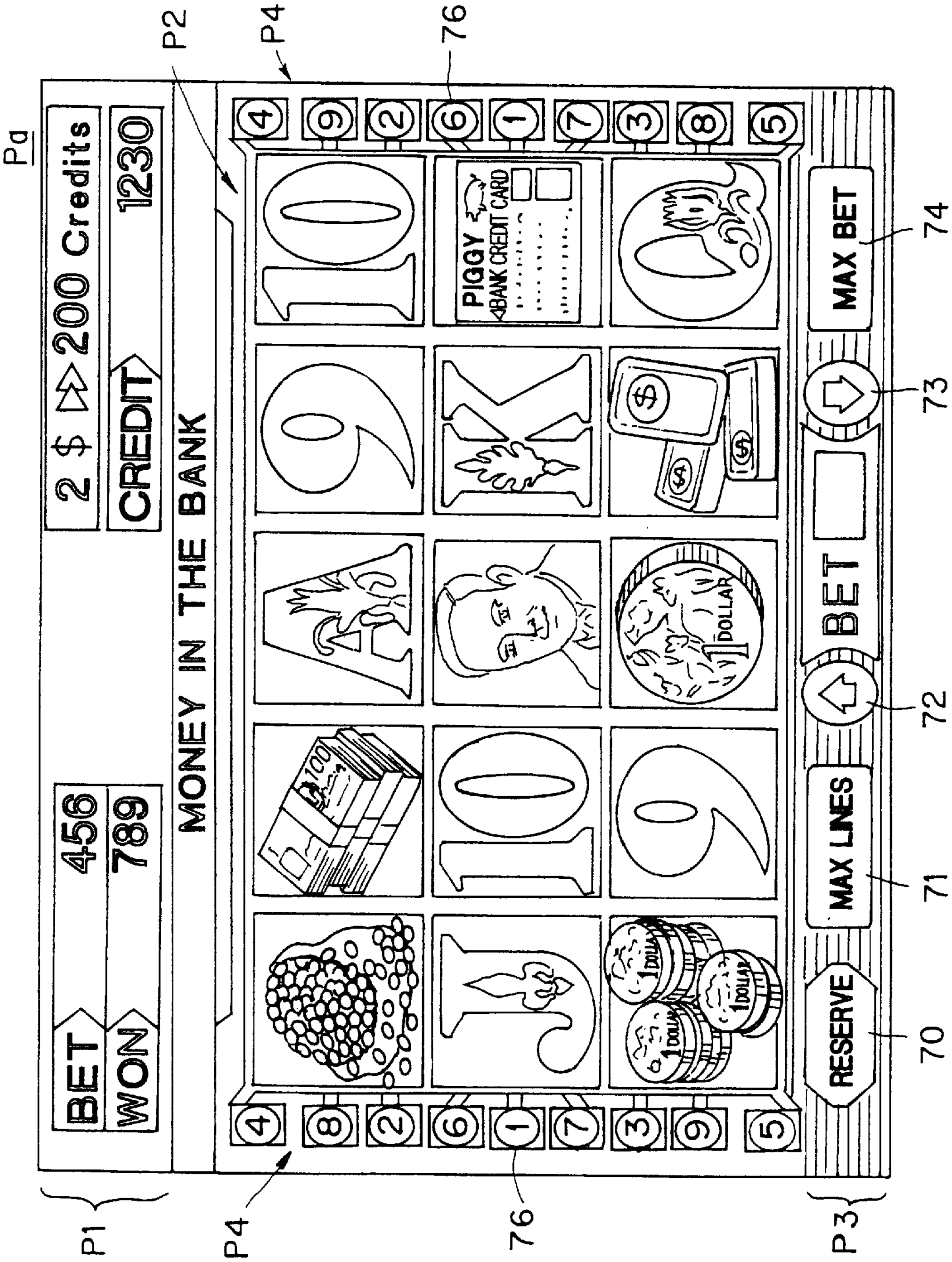
FIG. 4 is a view illustrating an example of an image displayed on a main display device.

FIG. 4 shows an example of a game image displayed in the main display device 7. This game image Pa comprises a value display portion P1 disposed at an upper part thereof, a play status display portion P2 disposed at a center thereof, an operation display portion P3 disposed at a lower part thereof and line select display portions P4, P4 disposed at both sides of the play status display portion P2. In the value display portion P1, there is displayed information, such as the current values of the bet, the win and the credit. In the play status display portion P2, there is displayed the status of the play, for example, a process for making a combination of symbols illustrated on five rows of reels. In the operation display portion P3, there are displayed images 70–74 representing various operation buttons in accordance with commands issued from the CPU 50. The function assigned to each operation button represented by each of the images 70–74 can be changed in accordance with the progressive condition of the game and so forth.

When the player touches, with his or her finger, any one of the positions at which the images 70–74 of the operation buttons are displayed, the signal corresponding to the touched position is issued from the coordinate readout device 57 to the CPU 50. The CPU 50 distinguishes the operation of the player, that is, which one of the operation buttons represented by the images 70–74 is touched on the basis of the signal issued from the coordinate readout device 57 in association with the contents of the image currently displayed in the sub-display device 31, and then changes the progressive condition of the game in accordance with the distinguished result. For example, if the player touches the position of the image 74 representing the words "MAX BET", the CPU 50 determines that the player requests to play the game with the maximum bet value allowed at this stage, and then executes the process corresponding to the request of the player.

The process of distinguishing the operation of the player against the operation buttons represented by the images 70–74 can be performed as follows. Namely, in the slot machine 1, the RAM 55 stores a data-table for specifying the relationship between the coordinates corresponding to the images 70–74 and functions currently assigned to each of the images 70–74 during the game. The CPU 50 distinguishes the coordinates corresponding to the signal issued from the coordinate readout device 57, and then identifies the function corresponding to the distinguished coordinates on the basis of the above mentioned data-table stored in the RAM 55.

In the line select display portion P4, there are displayed images 76 . . . representing operation buttons in association with the image of reels displayed in the play status display portion P2. If the player touches any one of positions at which the images 76 . . . are displayed, the line associated with the touched position is selected as a bet line.

As mentioned above, the slot machine 1 of this embodiment is provided with the coordinate readout device 57 on the main display device 7, and this device 57 operates as input members, such as push buttons for receiving instructions of the player. Thus, it is possible to distribute a part of input members which cannot be arranged on the operation panel 8 due to lack of space for the input members caused by the arrangement of the sub-display device 31. Therefore, the player can play the game by using the push button switches 21–24 and the logical operation buttons constituted on the main display device 7 without feeling inconvenience caused by a shortage of input members.

Figure 5:
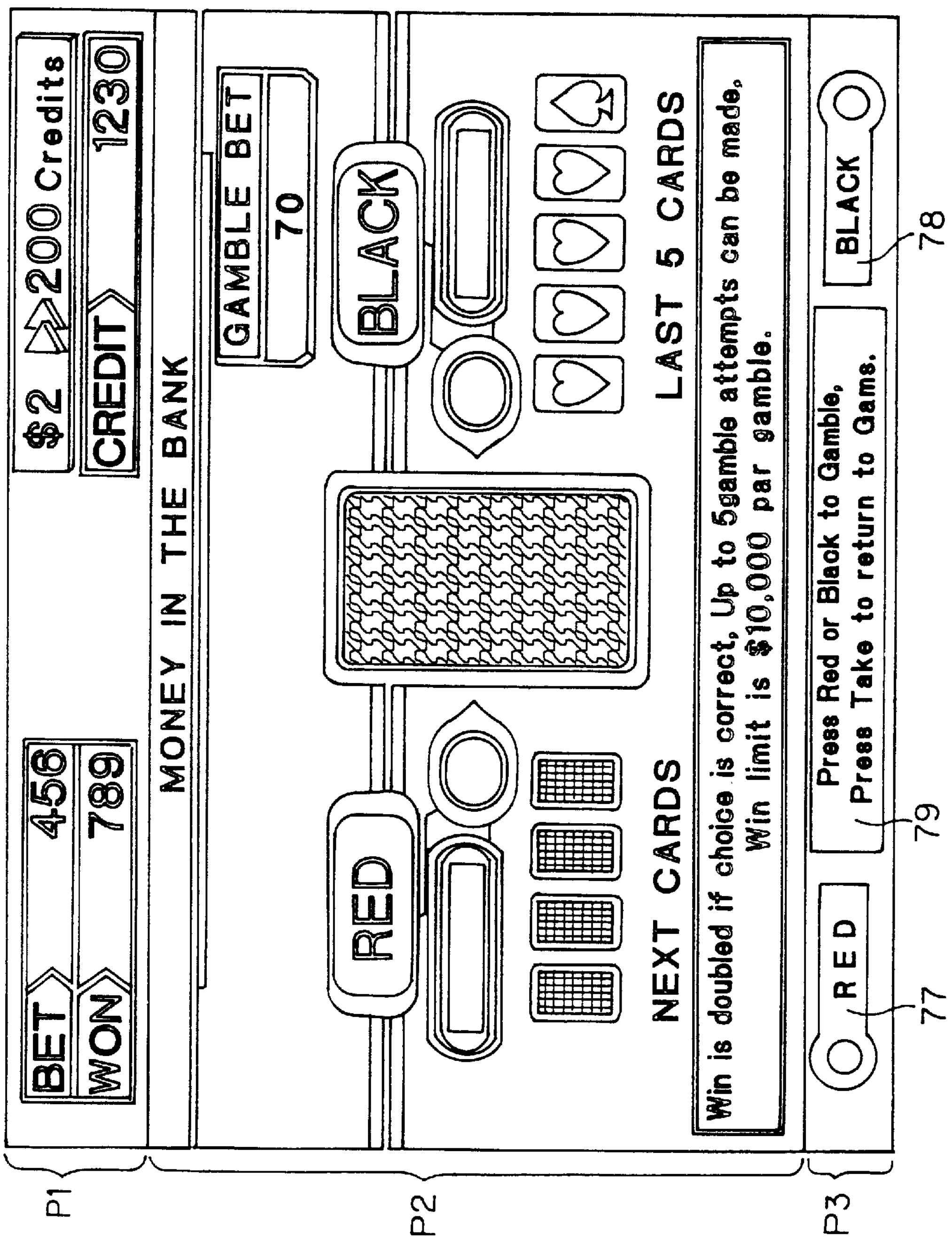
FIG. 5 is a view illustrating another example of an image displayed on the main display device.

The contents displayed in the operation display portion P3 can be fixed at all times, or may be properly changed in accordance with the progress of the game. For example, in the display image Pb of FIG. 5, images 77 and 78 of operation buttons with the words "RED" and "BLACK", respectively, are displayed in the left and right sides of the operation display portion P3, and between both sides, there are displayed an image 79 representing messages to urge or inform the next operation to the player. The display image Pb of FIG. 5 is for playing card games, so that the line select display portion P4 is omitted.

Figure 6:
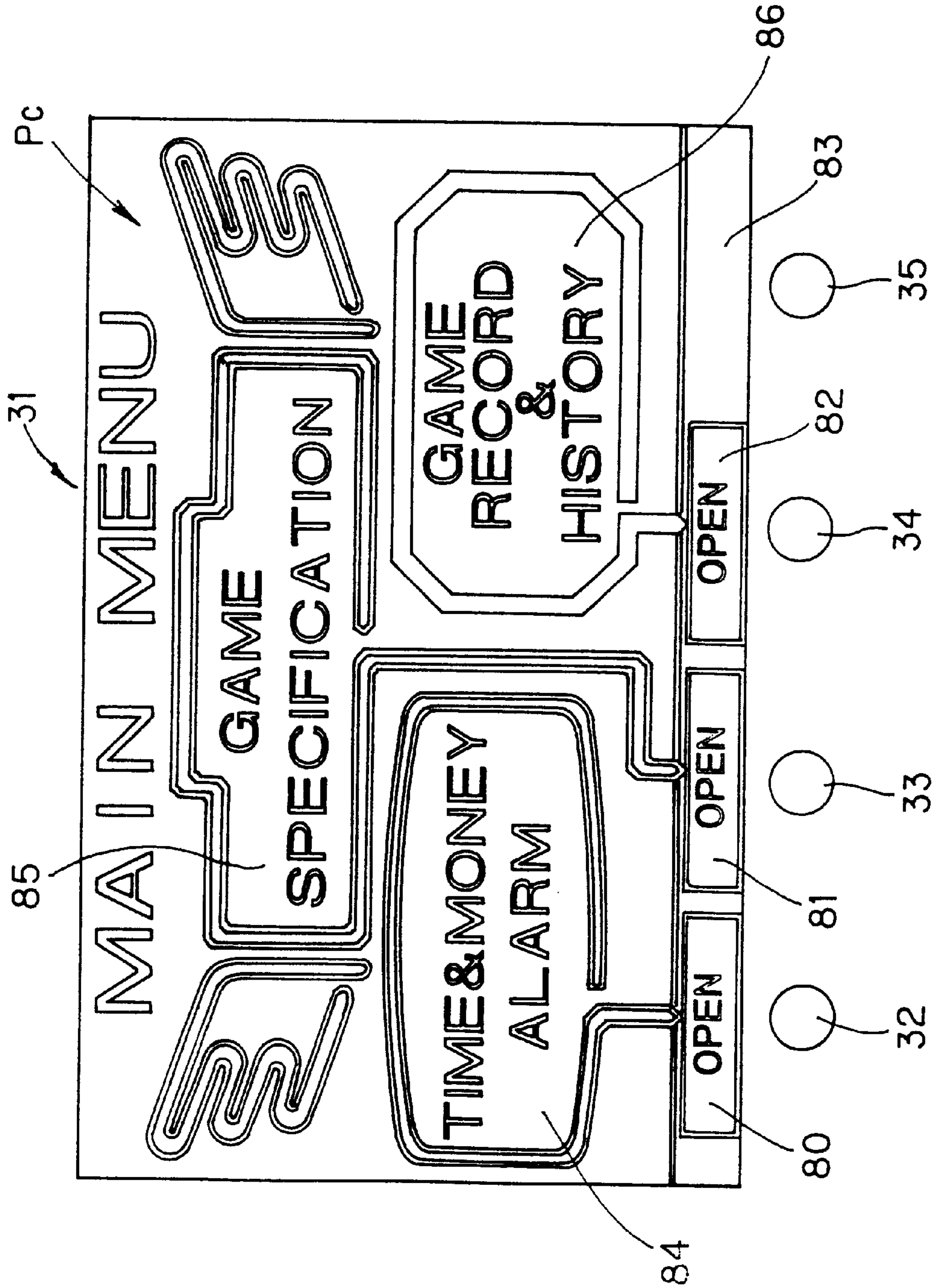
FIG. 6 is a view illustrating a main menu image displayed on a sub-display device.

FIG. 6 shows a main menu image Pc displayed in the sub-display device 31 as an initial image. The main menu image Pc includes button function display portions 80, 81, 82 and 83 adjoining the operation buttons 32, 33, 34 and 35, respectively, and caption display portions 84, 85 and 86 displaying captions of functions which can be set up by the operation buttons 32, 33 and 34. Each caption is visually associated with each of the button function display portions 80–82.

In the state that the main menu image Pc is displayed, the operation buttons 32–34 work as operable switches to call set-up images associated with the captions displayed in the caption display portions 84–86. Therefore, the word "OPEN", implying the operation of calling the set-up image, is displayed in each of the button function display portions 80–82. Since no function is assigned to the operation button 35 at this stage, no word is displayed in the button function. display portion 83.

If the operation button 32 is depressed when the main menu image Pc is displayed, the function of setting up alarms for money played and time played can be enabled.

Similarly, the function of displaying specifications of the slot machine 1 can be enabled in accordance with the operation of depressing the operation button 33, and the function of displaying the record and the history of the game can be enabled in accordance with the operation of depressing the operation button 34. These functions are not directly relevant to the progress of the game displayed in the main display device 7. Namely, the game displayed in the main display device 7 advances in accordance with the operations both of the operation buttons 21–24 and the operation buttons displayed on the main display device 7, and the progress of the game is not affected by the operations of the operation buttons 32–35.

Figure 7:
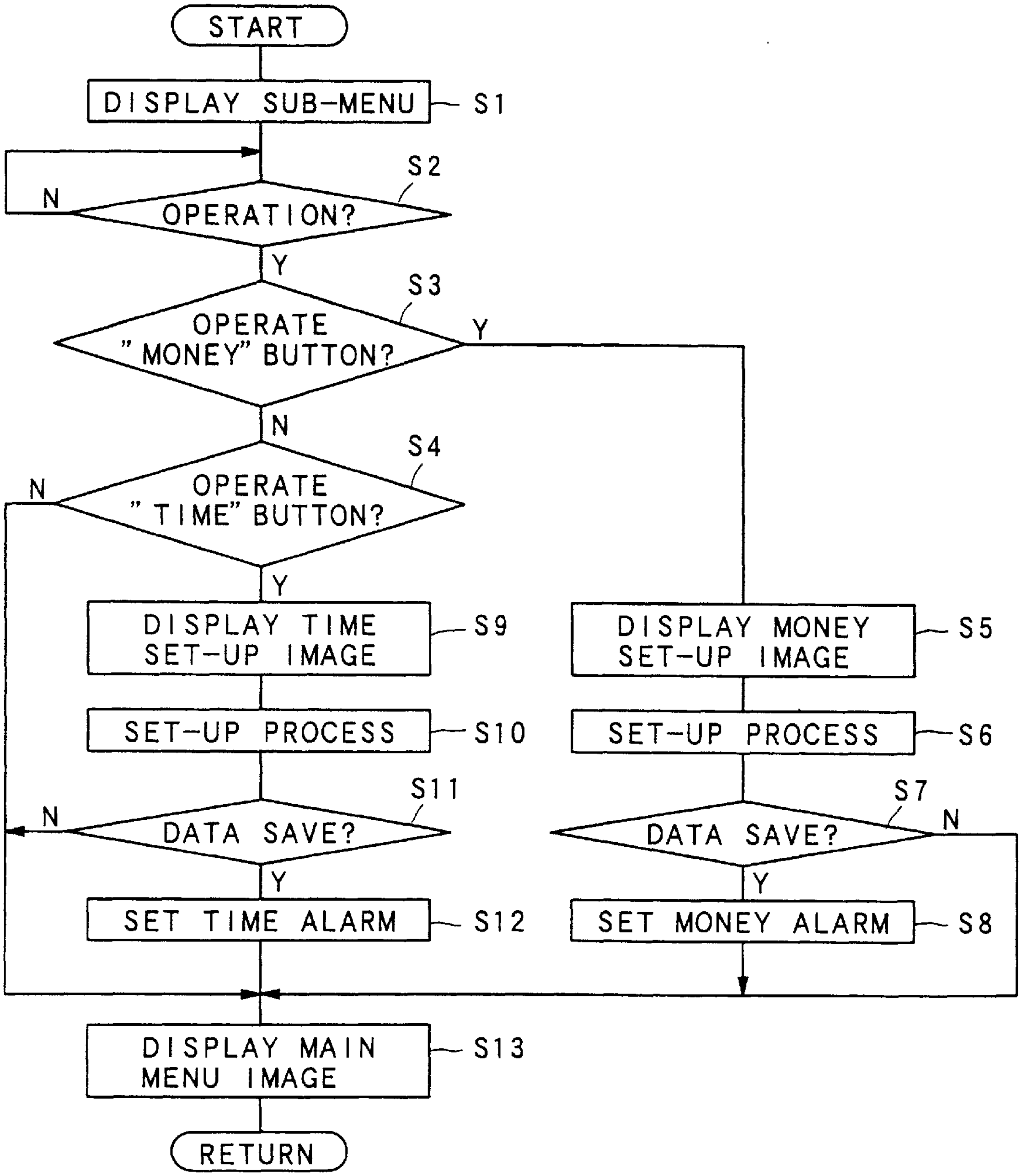
FIG. 7 is a flowchart showing a process for setting alarms for money consumption and operation time using the sub-display device and push buttons adjacent thereto.
Figure 8A:
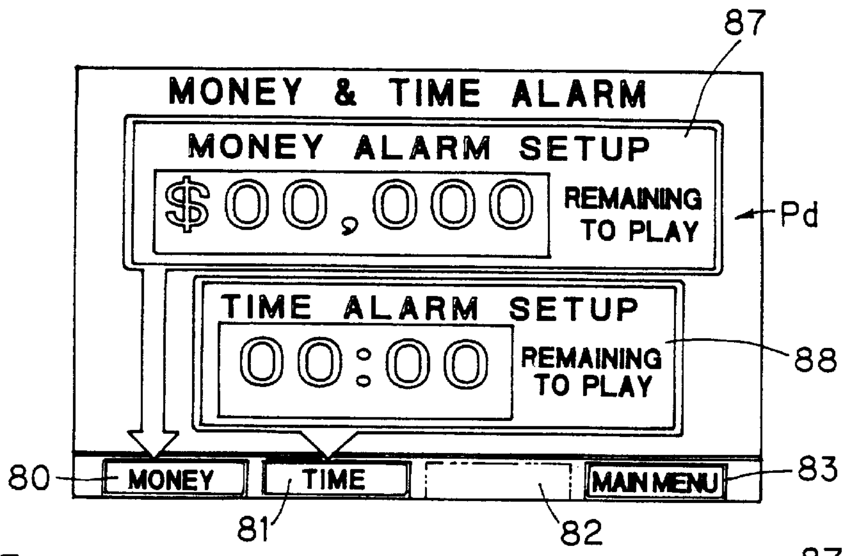
FIGS. 8A to 8C are views illustrating examples of images displayed in the sub-display device in the process of the flowchart illustrated in FIG .7.

FIG. 7 shows a process executed by the CPU 50 in response to the operation of depressing the operation button 32 when the image of FIG. 6 is displayed. In this process, first at a step 1, a set-up image Pd for setting up alarms for money and time illustrated in FIG. 8A is displayed as a sub-menu image associated with the operation of the operation button 32. At this stage, the operation button 32 works as a select button for advancing to the set-up of the money alarm, the operation button 33 works as a select button for advancing to the set-up of the time alarm, and the operation button 35 works as an operation button for requesting a return to the main menu image Pc, respectively. On the other hand, no function is assigned to the operation button 34. Therefore, in the set-up image Pd, the word "MONEY" is displayed in the button function display portion 80, the word "TIME" is displayed in the button function display portion 81 and the words "MAIN MENU" are displayed in the button function display portion 83, respectively, while no word is displayed in the button function display portion 82. Also, a money alarm set-up portion 87 associated with the button function display portion 80 and a time alarm set-up portion 88 associated with the button function display portion 81 are displayed, respectively.

Figure 8B:
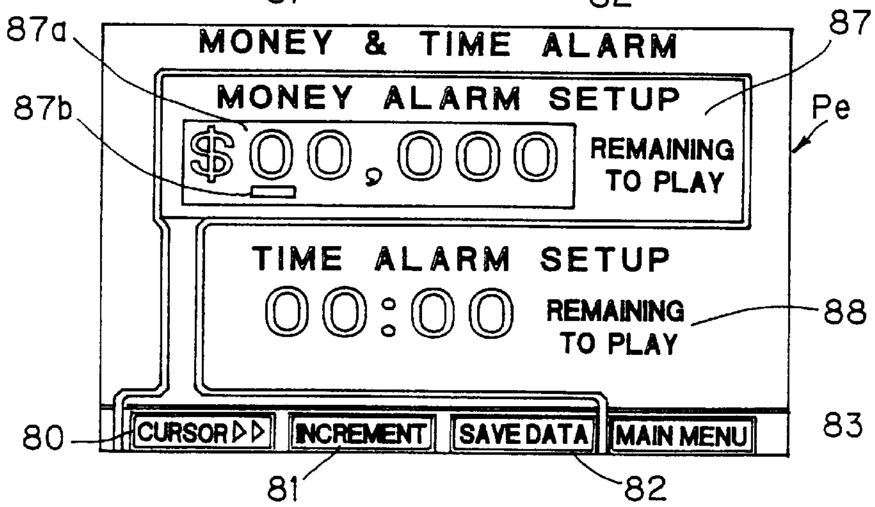

After displaying the set-up image Pd, the CPU 50 judges whether or not any one of the operation buttons 32, 33 and 35 is depressed (step S2), and if the depressing operation is detected, then the CPU 50 distinguishes which one of the operation buttons 32, 33 and 35 is operated (step S3 and step S4). If the operation button 32 is operated, the process proceeds to a step S5 to display a money alarm set-up image Pe illustrated in FIG. 8B. The player can set up the limit of the money consumption by referring the money alarm set-up image Pe. The limit of the money that consumption means the upper limit value of the money can be consumed in the games.

In the money alarm set-up portion 87 of the money set-up image Pe, there are displayed a counter 87*a* for displaying a value of the money currently set as the limit and a cursor 87*b* for indicating a specific place of the numerals displayed in the counter 87*a*. At this stage, the operation button 32 works as an operation button for moving the cursor 87*b*, the operation button 33 works as an operation button for increasing the numeral indicated by the cursor 87*b*, the operation button 34 works as an operation button for requesting to save the set-up value, and the operation button 35 works as an operation button for requesting to return to the main menu image Pc, respectively. Therefore, the word "CURSOR" is displayed in the button function display portion 80, the word "INCREMENT" is displayed in the button function display portion 81, the words "SAVE DATA" are displayed in the button function display portion 82, and the words "MAIN MENU" are displayed in the button function display portion 83, respectively.

After displaying the money alarm set-up image Pe, the process proceeds to a step S6 to perform a money alarm set-up process for setting up the limit of the money consumption. At this stage, the player can freely increase or decrease the value of the money alarm set in the counter 87*a* by using the operation buttons 32 and 33. If the operation button 34 or 35 is depressed during the process of the step S6, the CPU 50 advances the process to a step S7 and judges whether or not the operation button 34 is depressed, namely judges whether or not the data saving is requested. If the data saving is requested, the process proceeds to a step S8 to set the value determined at the step S6 into the money consumption counter 58 (refer to FIG. 3) as an initial value. If the data saving is not requested, the process proceeds to a step S13 to display the main menu image Pc.

Figure 8C:
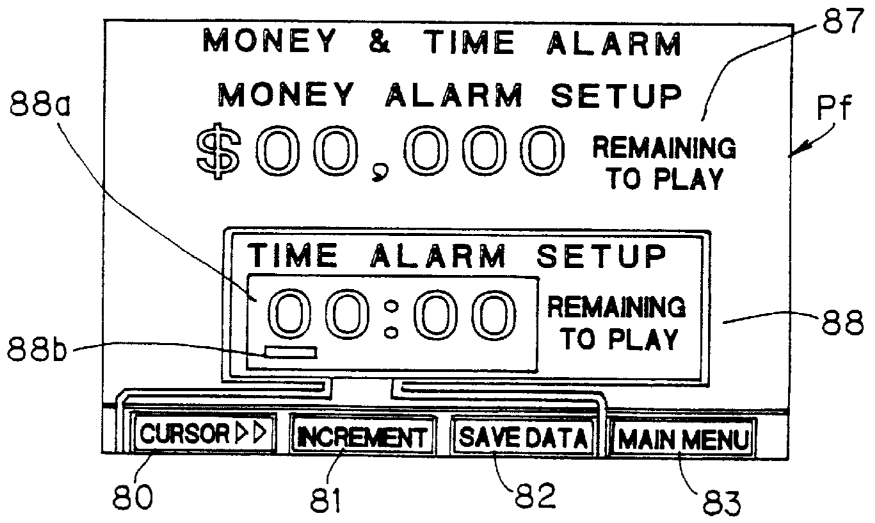

If it is judged at the step S3 or S4 that the operation button 33 is operated, the process proceeds to a step S9 to display a time alarm set-up image Pf illustrated in FIG. 8C. The player can set up the limit of the play time by referring the time set-up image Pf.

In the time alarm set-up portion 88 of the time alarm set-up image Pf, there are displayed a counter 88*a* for displaying the time currently set as a limit and a cursor 88*b* for indicating a specific place of the numerals displayed in the counter 88*a*. At this stage, the operation button 32 works as an operation button for moving the cursor 88*b*, the operation button 33 works as an operation button for increasing the numeral indicated by the cursor 88*b*, the operation button 34 works as an operation button for requesting to save the set-up value, and the operation button 35 works as an operation button for requesting to return to the main menu image Pc, respectively. Therefore, the word "CURSOR" is displayed in the button function display portion 80, the word "INCREMENT" is displayed in the button function display portion 81, the words "SAVE DATA" are displayed in the button function display portion 82, and the words "MAIN MENU" are displayed in the button function display portion 83, respectively.

After displaying the time alarm set-up image Pf, the process proceeds to a step S10 to perform a time alarm set-up process for setting up the time limit. At this stage, the player can freely change the value of the time alarm by using the operation buttons 32 and 33. If the operation button 34 or 35 is depressed during the process of the step S 10, the CPU 50 advances the process to a step S11 and judges whether or not the operation button 34 is depressed, namely judges whether or not the data saving is requested. If the data saving is requested, the process proceeds to a step S12 to set the value determined at the step S10 in the timer 59 (refer to FIG. 3) as an initial value. If the data saving is not requested, the process proceeds to the step S13 to display the main menu image Pc. If it is judged at the step S3 or S4 that the operation button 35 is operated, the process jumps to the step S13 to display the main menu image Pc.

After displaying the main menu image Pc after the above process, the CPU 50 starts operations for decreasing values set in the money consumption counter 58 and the timer 59. Namely, if the limit value is set in the money consumption counter 58 through the above process, the CPU 50 subtracts the bet value from the value currently counted in the money consumption counter 58 at each time when the player bets after the limit value is set. If the limit time is set in the timer 59, the CPU 50 activates the timer 59 to begin the count-down of the remaining time from the initial value set through the steps S9–S11 toward 0 with the predetermined time after the set-up of the limit time being a stating point. The starting point may be the time when the main menu image Pc is displayed after the process of FIG. 7. When the value counted in the money consumption counter 58 or the timer 59 reaches to 0, the CPU 50 issues a predetermined alarm to the player through, for example, the main display device 7 or the sub-display device 31. The player can be aware that the time to stop the game determined by himself or herself has come through the alarm. Various means, such as sound, an alarm display in the sub-display device 31 or the main display device 7 and the like can be used as the alarm.

Figure 9A:
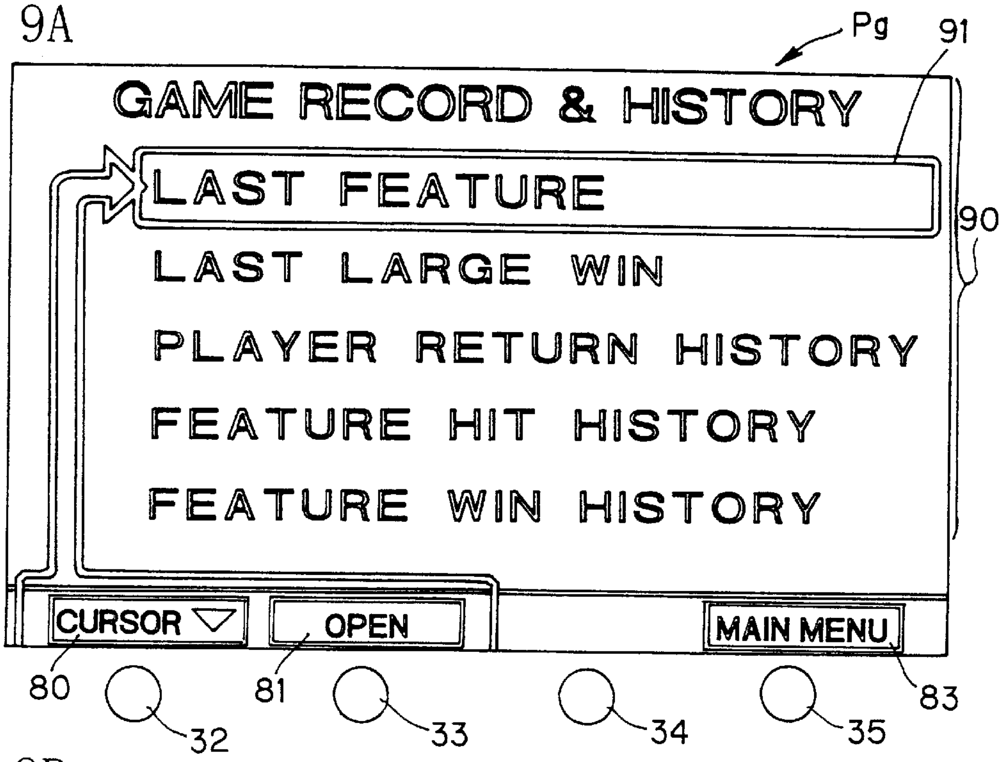
FIGS. 9A and 9B are views illustrating examples of images displayed in the sub-display device in another process performed using the sub-display and the push buttons adjacent thereto.
Figure 9B:
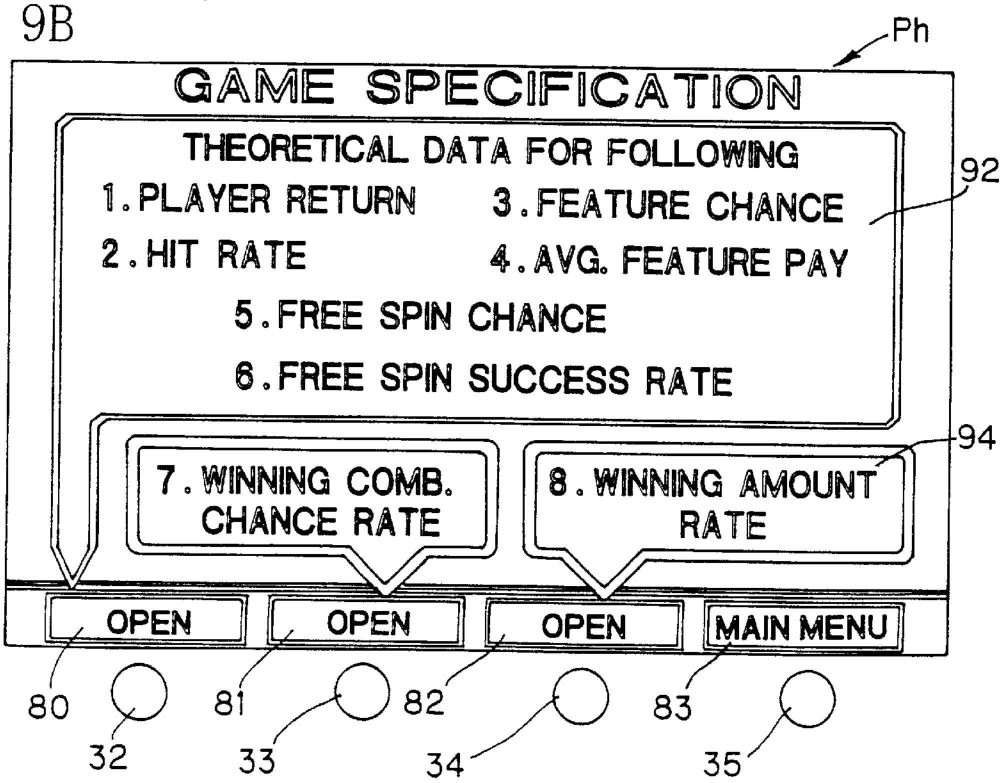

FIGS. 9A and 9B show sub-menu images Pg and Ph displayed in the sub-display device 31 in accordance with commands issued from the CPU 50 when the operation button 33 or 34 is depressed in the condition that the main menu image Pc is displayed.

In the sub-menu image Pg, there are displayed an item display portion 90 for displaying items capable of being selected in the sub-menu image Pg, and a select frame 91 for indicating the item currently selected in the item image portion 90. At this stage, the operation button 32 works as an operation button for moving the select frame 91 up and down, the operation button 33 works as an operation button for calling an image corresponding to the item selected by the select frame 91, the operation button 35 works as an operation button for requesting to return to the main menu image Pc, respectively. In association with the above, the word "CURSOR" is displayed in the button function display portion 80, the word "OPEN" is displayed in the button function display portion 81 and the words "MAIN MENU" are displayed in the button function display portion 83, respectively. The function display portion 82 is blank. If the player selects a desirable item by using the operation button 32 and then depresses the operation button 33, data corresponding to the selected item is displayed in the sub-display device 31. At this time, data useful for grasping the history of the slot machine 1, such as the number of wins, the probability of the win, the total amount of the pay-put money in the certain period from the past to the present are selected as the date to be displayed.

On the other hand, in the sub-menu image Pf illustrated in FIG. 9B, there are displayed item display portions 92, 93 and 94 for displaying items capable of being selected in the sub-menu image Pf. At this stage, the operation buttons 32, 33 and 34 work as operation buttons for opening each image corresponding to each item displayed in each of the item display portions 92, 93 and 94, respectively, and the operation button 35 works as an operation button for requesting to return to the main menu image Pc. Therefore, the word "OPEN" is displayed in each of the button function display portions 80, 81 and 82, and the words "MAIN MENU" are displayed in the button function display portion 83. If one of the operation buttons 32–34 is depressed, data corresponding to one of the items in the item display portions 92–94 is displayed in the sub-display device 31. At this time, data set up in the slot machine 1, such as the probability of the win, the rate of the pay-out to the player or the like, is selected as the date to be displayed. These data are theoretical values. By referring to these theoretical values and the record or the history displayed through the image Pg of FIG. 9A, the player can guess the frequency of wins or the degree of the pay-out rate with respect to the future play.

Figure 10:
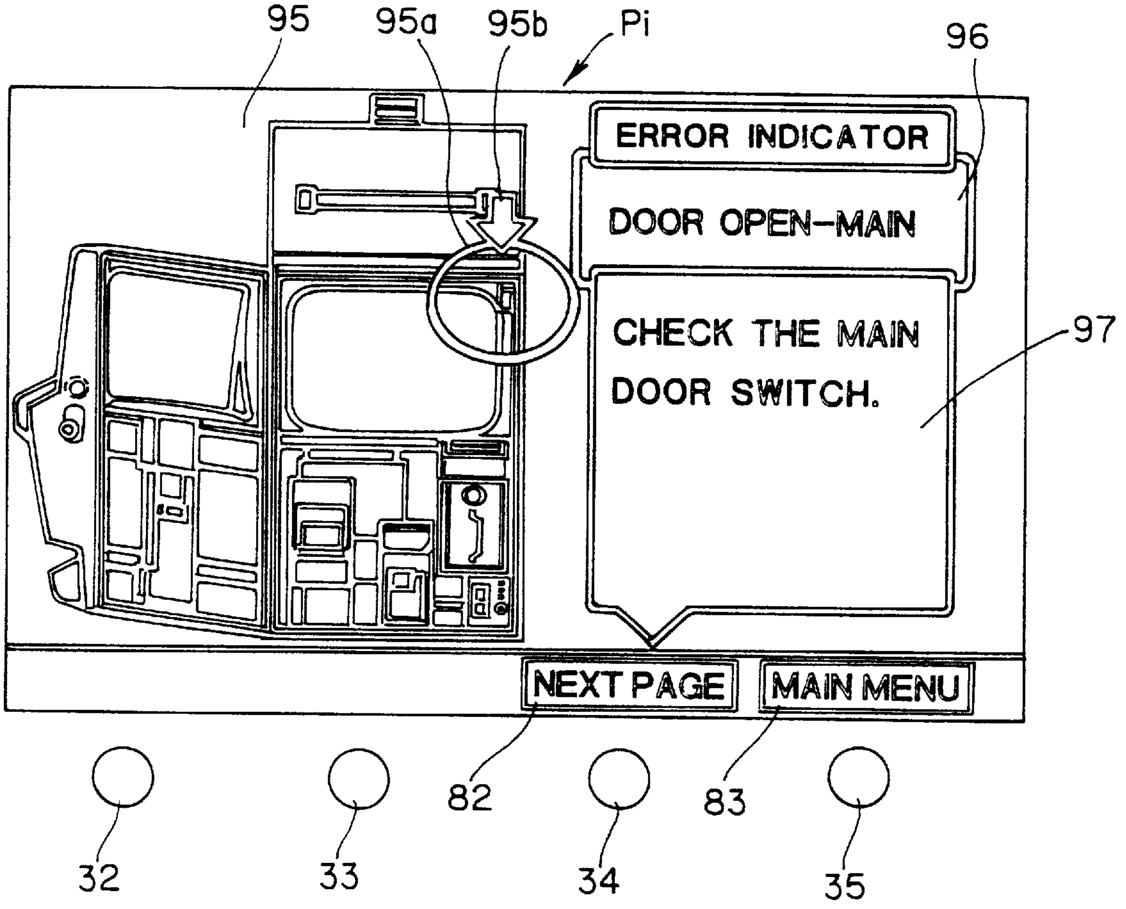
FIG. 10 is a view illustrating an example of an image displayed in the sub-display device when an error is detected through a diagnosis function equipped in the slot machine.

In the CPU 50, it can be possible to perform a diagnosis function for the electrical components disposed at each portion of the slot machine 1. In this case, if any error is detected, the position at which the error is occurred, the details of the error, and the way of fixing error is displayed in the sub-display device 31 to thereby enable the rapid recovery from the error. FIG. 10 shows an example of an error display image Pi. This error display image Pi comprises a position indication portion 95 in which the position of an error is indicated by an circle 95*a* and an arrow 95*b* in an figure imitating the housing 2 of the slot machine 1, a name indication portion 96 for indicating the name of the component falling into the error, and a guidance portion 97 for indicating the way of fixing the error. The operation button 34 works as an operation button for advancing to a next image and the operation button works as an operation button for returning to the main menu image Pc. Therefore, the words "NEXT PAGE" are displayed in the button function display portion 82 and the words "MAIN MENU" are displayed in the button function display portion 83.

The present invention is not limited to the above mentioned embodiment, but various variations can be implemented. For example, an input device similar to the coordinate readout device 57 may be put on the screen of the sub-display device 31 instead of the push button switches 32–35. Push button switches may be disposed on the periphery of the screen of the main display device 7 instead of the coordinate readout device 57 on the main display device 7, and the function assigned to each push button may be indicated on the screen of the main display device 7. In the above embodiment, information independent from the progress of the game are displayed in the sub-display device 31 in association with the operation of the push buttons 32–35 adjacent to the screen of the sub-display 7, however, a part or the whole of the sub-display device 31 and the push buttons 32–35 may be used for advancing the game. It may be possible to disable the player from setting up the condition of stopping the game, thereby uniformly issuing the alarm when the fixed condition is satisfied.

In the above mentioned embodiment, the CPU 50 works as a sub-image display control device, a set-up device, a detection device, a judging device, and an alarm device by being combined with a particular software. However, a part or all of these devices can be replaced with a logical circuit. A CPU working as these devices may be provided apart from the CPU 50 for controlling the process of the game.

What is claimed is:

1. A slot machine comprising:

a housing having a front side with an operation panel disposed thereon;

a main display device having a screen disposed on the front side of the housing above the operation panel;

a sub-display device disposed on the operation panel for displaying game or machine related information;

a main input device for accepting manual operation of a player and issuing information corresponding to the manual operation of the player, the main input device including a first input device provided on the operation panel and a second input device provided on the screen of the main display device; and a game controller for controlling a process of a game performed on the screen of the main display device based on the information issued from the main input device.

2. A slot machine according to claim 1, wherein the second input device includes a coordinate readout device, including a transparent panel, for issuing signals specifying coordinates of a position touched on the transparent panel by the player.

3. A slot machine according to claim 2, wherein:

the game controller displays an image representing an operation button, for executing a predetermined function, on a predetermined area on the screen of the main display device; and the controller responds to the manual operation of the player based on the signals issued from the coordinate readout device and contents displayed in the predetermined area on the screen of the main display device.

4. A slot machine according to claim 3, wherein the game controller includes a procedure for changing the contents displayed in the predetermined area on the screen of the main display device.

5. A slot machine according to claim 3, wherein the game controller includes a procedure for changing images displayed in at least a part of the predetermined area between the image of the operation button and an image representing a message to the player.

6. A slot machine according to claim 2, wherein the first input device comprises a push button switch.

7. A slot machine according to claim 1, further comprising:

the sub-display device having a screen; and a sub-input devices provided on one of the screen of the sub-display device or an area outside a periphery of the screen, for accepting manual operation of the player and issuing information corresponding to the manual operation of the sub-input device.

8. A slot machine according to claim 7, further comprising a sub-image display control device for controlling contents displayed on the screen of the sub-display device based on the information issued from the sub-input device.

9. A slot machine according to claim 8, wherein:

the sub-input device is a push button switch, capable of being depressed by the player, is provided outside of the screen of the sub-display device; and the sub-image display control device displays an image, representing a function assigned to the push button switch, on the screen of the sub-display device such that the push button switch and the image for representing the function are visually related.

10. A slot machine according to claim 1, wherein the operation panel has a first end, a second end, an insertion portion for receiving one of a medal and a slip to be bet on the a game dispose at the first end, the screen of the sub-display device is disposed at the second end of the operation panel, and the first input device is disposed between the insertion portion and the screen of the sub-display device.

11. A slot machine according to claim 1, wherein an operation of relatively high frequency in a plurality of operations necessary for the game is assigned to the first input device, and another operation of relatively low frequency in the plurality of operations is assigned to the second input device.

12. A slot machine according to claim 1, further comprising:

the sub-display device having a screen;

a sub-input device, provided on one of the screen of the sub-display device or an area outside a periphery of the screen, for accepting manual operation of the player and issuing information corresponding to the manual operation of the sub-input device a set-up device for setting up a stop condition for limiting continuation of the game to a predetermined degree in accordance with an instruction inputted by the manual operation of the player via the sub-input device;

a memory device which stores data of the stop condition set up by the setup device;

a detection device for detecting an actual degree of the continuation of the game;

a judging device for judging whether the stop condition is satisfied based on the data of the stop condition stored in the memory device and the actual degree detected by the detection device; and an alarm for device issuing a predetermined alarm when the judging device judges that the stop condition is satisfied.

13. A slot machine according to claim 12, wherein the detection device detects the actual degree of the continuation from a reference time at which the stop condition is set up by the set-up device.

14. A slot machine comprising:

a housing having a front side with an operation panel disposed thereon;

a main display device having a screen disposed on the front side of the housing above the operation panel;

a sub-display device disposed on the operation panel;

a main input device for accepting manual operation of a player and issuing information corresponding to the manual operation of the player, the main input device including a first input device provided on the operation panel and a second input device provided on the screen of the main display device;

a game controller for controlling a process of a game performed on the screen of the main display device based on the information issued from the main input device;

the sub-display device having a screen;

a sub-input device, provided on one of the screen of the sub-display device or an area outside a periphery of the screen, for accepting manual operation of the player and issuing information corresponding to the manual operation of the sub-input device a set-up device for setting up a stop condition for limiting continuation of the game to a predetermined degree in accordance with an instruction inputted by the manual operation of the player via the sub-input device;

a memory device which stores data of the stop condition set up by the set-up device;

a detection device for detecting an actual degree of the continuation of the game;

a judging device for judging whether the stop condition is satisfied based on the data of the stop condition stored in the memory device and the actual degree detected by the detection device;

an alarm for device issuing a predetermined alarm when the judging device judges that the stop condition is satisfied;

the game controller paying out a prize to the player in accordance with play value bet on the game by the player and a result of the game;

the set-up device setting a play value limitation on a total amount of the play value consumed by the player as the stop condition;

the detection device detecting an actual total amount of the play value consumed by the player; and the judging device judging that the game is to discontinue when the actual total amount of the play value consumed, detected by the detection device, reaches to the play value limitation of the total amount thus satisfying the stop condition.

15. A slot machine comprising:

a housing having a front side with an operation panel disposed thereon;

a main display device having a screen disposed on the front side of the housing above the operation panel;

a sub-display device disposed on the operation panel;

a main input device for accepting manual operation of a player and issuing information corresponding to the manual operation of the player, the main input device including a first input device provided on the operation panel and a second input device provided on the screen of the main display device;

a game controller for controlling a process of a game performed on the screen of the main display device based on the information issued from the main input device;

the sub-display device having a screen;

a sub-input device, provided on one of the screen of the sub-display device or an area outside a periphery of the screen, for accepting manual operation of the player and issuing information corresponding to the manual operation of the sub-input device;

a set-up device for setting up a stop condition for limiting continuation of the game to a predetermined degree in accordance with an instruction inputted by the manual operation of the player via the sub-input device;

a memory device which stores data of the stop condition set up by the setup device;

a detection device for detecting an actual degree of the continuation of the game;

a judging device for judging whether the stop condition is satisfied based on the data of the stop condition stored in the memory device and the actual degree detected by the detection device;

an alarm for device issuing a predetermined alarm when the judging device judges that the stop condition is satisfied;

the set-up device setting a time limitation of play time as the stop condition;

the detection device detecting actual play time; and the judging device judging that the game is to discontinue when the actual play time, detected by the detection device, reaches the time limitation of the play time thus satisfying the stop condition.

* * * * *